May 16, 1944.　　　F. A. NOVOTNEY　　　2,348,993
ELEVATING GATE
Filed May 7, 1943　　　4 Sheets-Sheet 1

Inventor
Frank A. Novotney
by Parker & Carter
Attorneys.

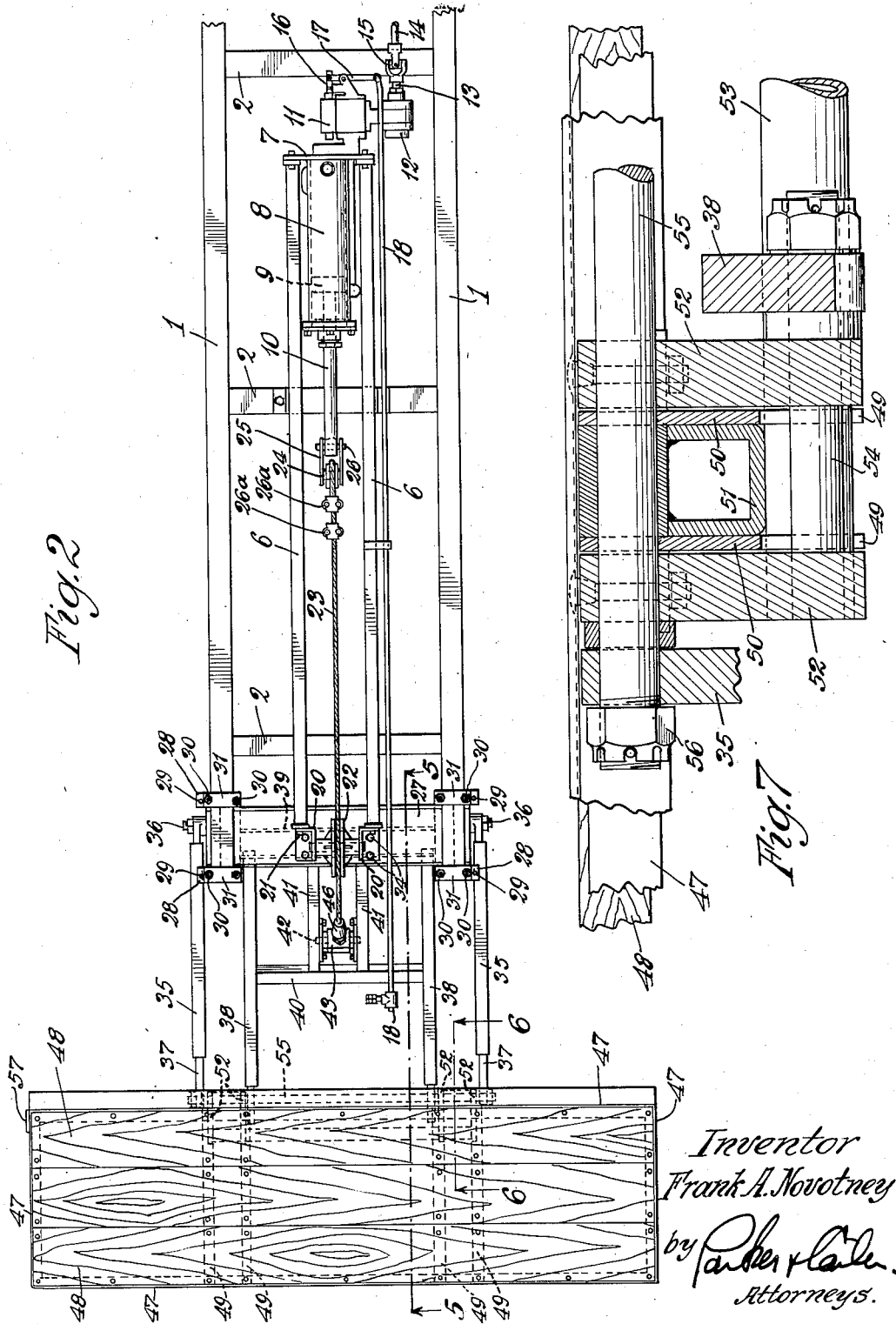

May 16, 1944.  F. A. NOVOTNEY  2,348,993
ELEVATING GATE
Filed May 7, 1943  4 Sheets-Sheet 3
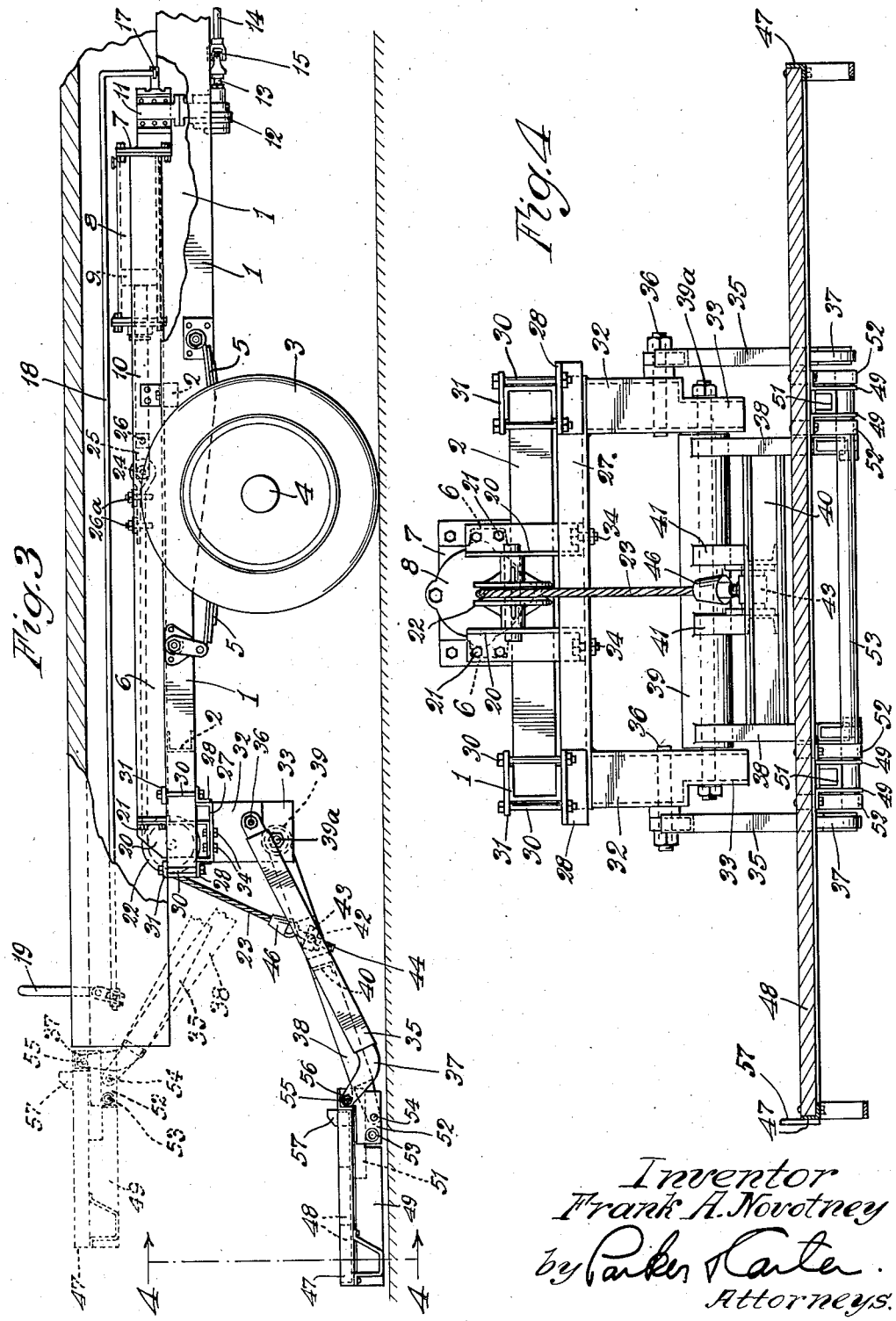
Inventor
Frank A. Novotney
by Parker Carter
Attorneys.

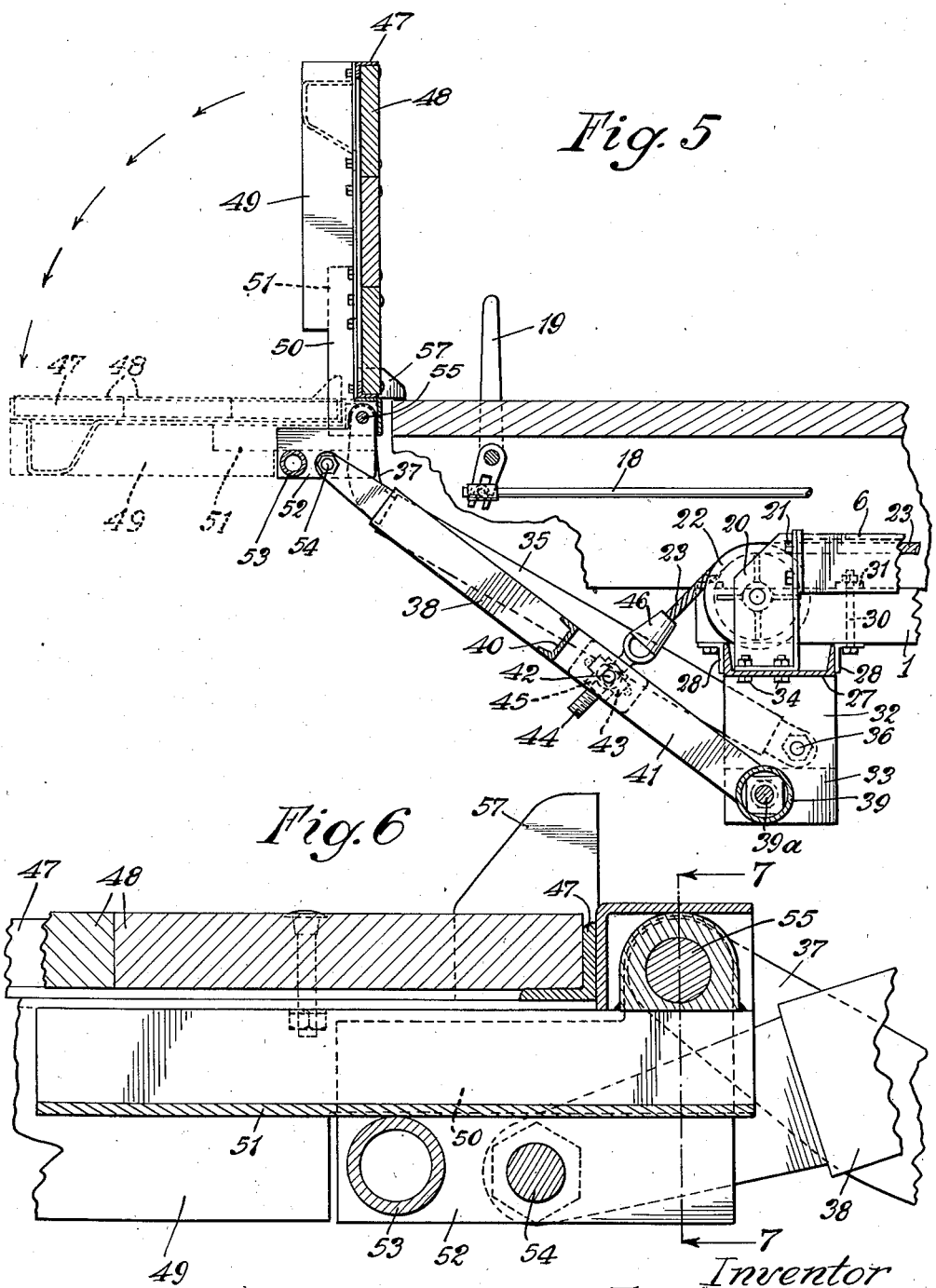

Patented May 16, 1944

2,348,993

UNITED STATES PATENT OFFICE 2,348,993

ELEVATING GATE

Frank A. Novotney, Streator, Ill.

Application May 7, 1943, Serial No. 485,993

16 Claims. (Cl. 214—77)

This invention relates to a gate construction and is particularly adaptable to use as a tail gate for a receptacle. In one application the structure of the invention is embodied in a vehicle in which a body is mounted on the vehicle and a tail gate is provided for opening and closing the rear of the vehicle body. The invention has for one object the provision of a mechanically driven tail gate which may be lowered to a point below the body and may be raised to a point on a level with a body and may be further raised to close the body.

Another object is to provide, in connection with such a tail gate, means for retaining the tail gate in a horizontal position during a substantial portion of its raising and lowering movement.

A still further object is to provide a power means for raising a tail gate from approximately ground level to the level of a body mounted on a vehicle, whereby a load may be raised from the ground to the vehicle body level.

Other objects will appear from time to time throughout the specification and claims.

This invention is illustrated more or less diagrammatically in the accompanying drawings, wherein:

Figure 2 is a plan view of the device of Figure 1.

Figure 3 is a side elevation of the device with parts broken away and parts in section.

Figure 4 is a transverse vehicle section taken at line 4—4 of Figure 3, showing parts in section and in elevation.

Figure 5 is an enlarged, vertical, longitudinal section taken at line 5—5 of Figure 2, and illustrating the gate in the raised and in the closed position.

Figure 6 is a sectional detail taken on a further enlarged scale at line 6—6 of Figure 2.

Figure 7 is a transverse, vertical sectional detail taken at line 7—7 of Figure 6.

Like parts are indicated by like characters throughout the specification and the drawings.

Figure 1:
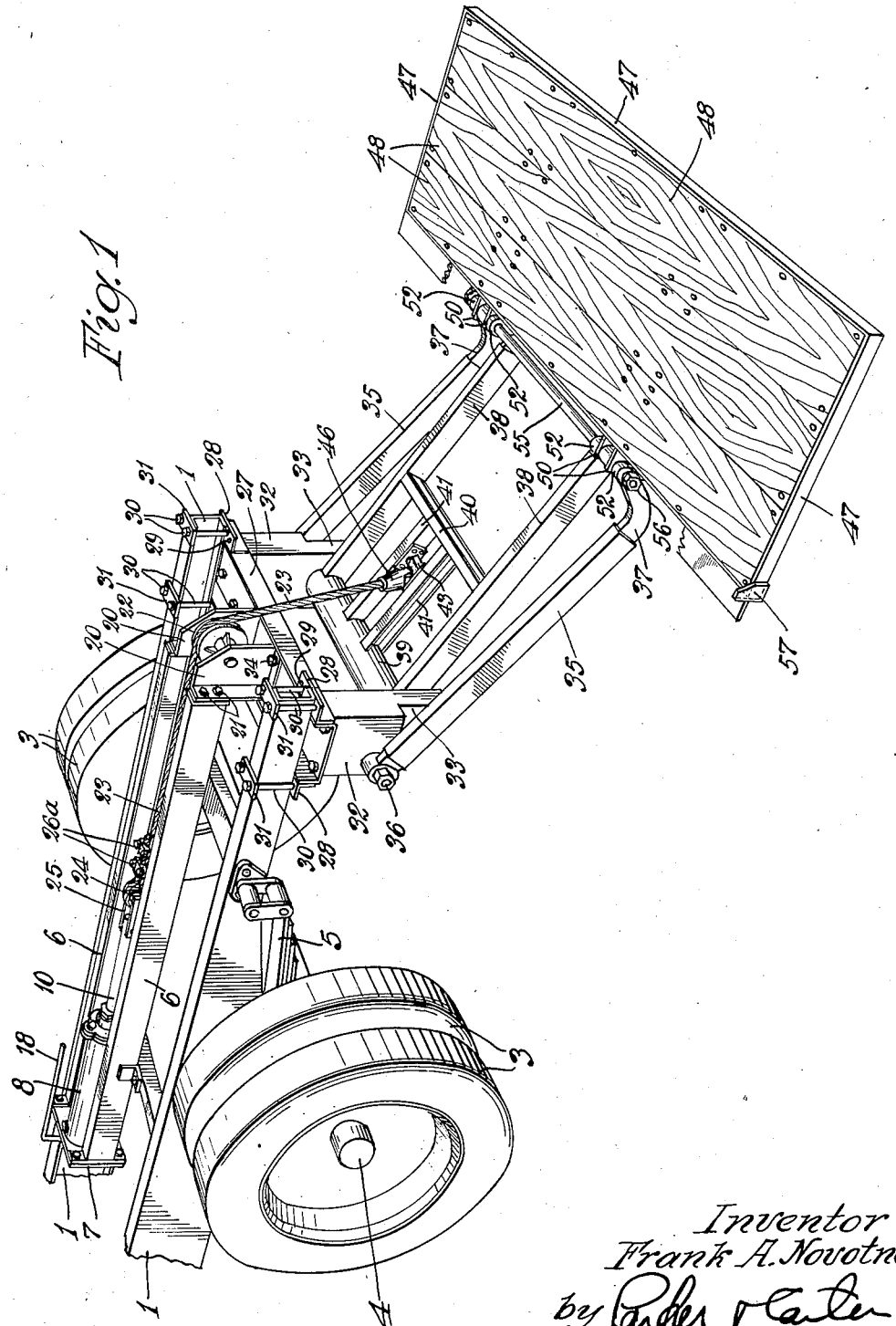
Figure 1 is a rear perspective view of the gate of the invention mounted on a truck.

In the particular form shown, the invention is applied to an automotive truck. The details of the truck are only sufficiently shown to illustrate the application of the structure of the invention to the truck. As shown, the truck is provided with a frame which includes longitudinal members 1, 1, which are connected by one or more transverse members 2, 2. The truck is supported by wheels 3, which are carried upon an axle indicated at 4, which latter is supported from the truck by springs 5 or otherwise. Obviously the invention might equally well be applied to a stationary container or to a trailer or other vehicle.

The mechanism may be considered generally as comprising three assemblies. First, there is a power assembly; second, the assembly which supports the gate; and third, there is the gate itself. These will be described in the order named.

The power assembly includes a plurality of longitudinal frame members 6, 6 which may be joined by a transverse plate or base member 7 at one end. Secured to the member 7 is a hydraulic cylinder 8, within which is mounted a piston 9 which is secured to a piston rod 10. The latter projects from the cylinder. A controlling valve housing 11 is secured to the plate 7 and connected to the cylinder. The details of the valve and the housing are not shown, as they form no essential part of the invention. A pump 12 is connected to the valve housing and is provided with a shaft 13 which may be driven by a shaft 14 which is itself connected to any suitable source of power. A universal joint 15 connects the shaft 13 and the shaft 14. A valve controlling member 16 projects, as shown particularly in Figure 2, from the housing 11 and is connected to an operating lever 17 which is pivoted on a suitable support. A rod 18 is connected to the lever 17 and at its rear end is connected to an operating handle or lever 19 which is pivoted upon any suitable support. The handle 19 may be moved to operate the valve controlling means to direct pressure fluid to either end of the cylinder or to short-circuit fluid or otherwise to control the operation of the hydraulic system.

A pair of plates or frame members 20, 20 is secured, as at 21, respectively to each of the longitudinal frame members 6. Journaled between the plates 20 is a sheave 22. A raising and lowering cable 23 is engaged in the sheave and at one end, as at 24, is secured to the piston rod 10. It may be secured to the piston rod in any desired manner. As shown, however, a link is pivoted to the piston rod, as at 26, and one end of the cable 23 is positioned about the link 25. Attaching means 26—a serve to secure the end of the cable 23 in the manner shown particularly in Figures 1 and 2. Obviously other attaching means might be used without departing from the invention. The means for attaching the other end of the cable 23 to the tail gate will be described below.

The second assembly includes the means for mounting the gate upon the rear of a vehicle. In the particular form shown, this mounting means includes a transverse member 27. As shown, this member is of channel shape, but it might be otherwise shaped. Secured at each end to the channel and projecting outwardly from it is a pair of perforated extensions 28. Each of these extensions is provided with a number of perforations 29. These perforations receive attaching bolts or screws and provide adjustable means for mounting the transverse member 27 on the vehicle frame. It is recognized that commercial vehicles are available in several different sizes and that the longitudinal frame members of such vehicles are not uniformly spaced apart. The frame members of one vehicle may be spaced apart a given distance, and the frame members of another vehicle may be spaced apart a different distance. For that reason, a number of perforations 29 is provided, and by using suitable perforations, the member 27 may be satisfactorily mounted on any one of a wide variety of vehicle frames without the necessity of changing the construction or the addition of extra parts.

The particular perforations in which the attaching bolts will be positioned when the device is mounted on a vehicle depends upon the distance between the side frame members of the particular vehicle on which the device is to be mounted. As shown, bolts or screws 30 are mounted in some of the perforations 29, and they pass through plates 31 which are positioned upon the upper edges or faces of the vehicle side frame members 1. The construction just described has, therefore, the advantage of being adaptable, without the addition of extra parts, to a wide variety of vehicle sizes and frame spacings.

Projecting downwardly from the transverse member 7 are supports 32. As shown particularly in Figures 1 and 2, each of the parts is provided with a downward extension 33 which is of less width than the main portion 32. The members 32 may be formed in any desired manner. As here shown, they are generally hollow and they are made up of a number of structural members or plates welded together, but they are not limited to this manner of construction. If desired, the plates 20, between which the sheave 22 is journaled, are also secured at their lower edges to the transverse member 27 by screws or bolts 34.

The gate mechanism itself includes pairs of arms and the gate proper. As shown, a pair of outer arms 35 is journaled upon stub shafts 36 which are supported in the members 32. At their free ends the arms 35 are provided with upwardly curved horns 37. The arms in the particular form shown are built up from structural members or plates welded together. They might be made in other ways.

A pair of inner arms 38, 38 is secured to a tubular member 39, which is journaled upon a shaft 39a, which shaft is secured or mounted in the lower extensions 33 of the members 32. Intermediate their ends the shafts 38 are joined by a transverse member 40 and a pair of parallel members 41 is secured at one end to the tube 39 and at their forward ends to the transverse member 40. Between the parallel members 41 is journaled a shaft 42 in which is positioned an adjusting nut 43. An adjusting screw 44 is received in the nut and may carry a locking nut 45. The screw 44 is provided at its upper end with a rope or cable receiving portion 46, within which one end of the cable 23 is secured. The adjusting nut and screw arrangement is desirable to adjust the link of the cable with respect to its points of attachment upon the gate. Inevitably slack will develop in the mechanism, and it is desirable to have a convenient adjusting means which can be adjusted readily and without the necessity of disconnecting any of the members and which can be adjusted from a convenient position of the operator. When the gate is in the lowered position of Figures 1 and 3, the lock nut and adjusting mechanism can be readily manipulated by the operator to accomplish the necessary adjustments.

The gate may be made entirely of wood or entirely of metal or a combination of the two. In the form here shown, the gate comprises metallic frame members 47, to which a plurality of wooden planks or boards 48 are secured. A pair of main transverse members is secured to or formed as a part of the gate frame, and these are formed of the members 49, which in the particular form here shown are of channel section. They are cut away, as at 50, and may receive reinforcing members 51 placed between the flanges of the members 49 and 50. Two pairs of bracket members 52, 52 are positioned approximately in line with the flanges 49, 49. As shown particularly in Figure 7, they are positioned just far enough apart to permit the flanges 50 to fit between them. The pairs of members 52 are secured to a transverse tie rod 53. To the innermost of each of the members 52 is pivoted the outer or free end of each of the inner arms 38, these arms being pivoted upon stub shafts 54, one of which is positioned between each pair of the members 52. Extending transversely between the pairs of members 52 and extending laterally beyond them, is a shaft 55. The outer or free end of each of the outer arms 35 is journaled upon the shaft 55 and is held in place thereon by a nut 56. A bracket or shoulder member 57 may be added, as shown particularly in Figures 1, 2 and 5, to the gate. This member, as shown in Figure 5, rests upon the upper surface of the body or platform and tends to hold the gate from downward movement, should slack develop in the cable 23 from any cause. One or more such members 57 may be used, if desired, or they may be entirely omitted.

The use and operation of the device will be the same whether the invention is embodied in the tail gate of a vehicle body or in a gate or wall mounted on a stationary receptacle or is used merely as a raising platform.

As shown in the drawings and described above, the invention comprises generally hydraulic hoisting means, a movably mounted tail gate, and a connection between the hoisting means and the tail gate whereby the gate may be raised. In the particular form shown, longitudinally disposed frame members are mounted on the vehicle and they form, in effect, a frame or backbone upon which a hydraulic cylinder and piston assembly and a pump and valve assembly are mounted. This structure forms, in effect, the hoisting unit. A gate-carrying unit is mounted transversely with respect to the hoisting unit, and the gate is pivoted thereon, as shown. When a load is to be raised, the gate is lowered, and it may be lowered to a point where it is in contact with and raised upon the ground. The load then is put on the gate and requires only to be lifted a very small distance. After the load is in place, the hoisting control is operated and pressure fluid is forced into the cylinder and moves the piston in the hoisting direction, drawing in upon the raising cable or equivalent means, and the gate is raised. The arrangement of the arms which carry the gate is such that after the gate is raised, it remains horizontal. The relative proportions of the arms and their relative points of attachment to the supporting assembly and to the gate accomplish this result. The gate will remain horizontal throughout its entire movement until it reaches a position approximately on a level with the body floor. In this position it is above the top of the hoisting unit frames, and the arms are inclined upwardly. When the gate has been raised to the desired point, the load upon it is shifted into the body. If no further load is now to be taken into the truck or vehicle, the gate is manually swung upwardly about its pivot point, and it may be latched or otherwise held closed.

When a load is to be lowered, the process above described is repeated substantially in reverse order. The gate is moved from the closed position to the horizontal raised position and the load is shifted onto the gate, whereupon the hoisting controls are operated to release pressure fluid from the cylinder and to permit the piston to move outwardly. As this movement occurs, the gate is lowered and remains horizontal during its entire movement. The gate is, of course, lowered either to the ground or to any other level suitable for discharging the load from it. Obviously the raising and lowering operations are repeated either until the entire load has been discharged or until the entire load has been picked up.

The raising of the gate in response to the movement of the hoisting cable and the arms which carry the gate is complete when the gate has reached substantially the position shown in dotted lines in Figures 3 and 5. If it is desired to close the vehicle by moving the gate to the closing position, that is done manually. The hoisting mechanism, including the arms, the tie rod 53, the bracket members 52 and the stub shafts 54, remain stationary. The gate, however, can be swung upwardly about the shaft 55, which serves thus as the pintle of a hinge. When the gate is tilted upwardly, the flange or frame members 49, 50 move out of contact with the bracket members 52. The closed position of the gate is shown in full lines in Figure 5 and in dotted lines in the same figure. The movement of the gate and the gate frames from the raised position to the closed position is clearly shown in that figure. When the gate is moved from the raised to the closed position, only the gate moves. All of the hoisting and supporting mechanism remain stationary. Obviously, when the gate is moved from the closed to the raised position, that is to say, from the full line position of Figure 5 to the dotted line position of Figure 5, only the gate moves, and the hoisting and supporting mechanism remains stationary, but the gate is again moved to the position which brings the gate frame members 49, 50 into position between the bracket members 52 and resting upon the tie rod 53. If the bracket member 6 is omitted, the gate when moved to the full line position of Figure 5 will remain in that position and, of course, may be latched to other parts of the body, such as the side walls in any one of the several ways now used in latching tail gates in the closed position. While the gate is in the raised poistion of Figure 5, its weight is already or largely supported by the raising assembly, and should pressure leak from the cylinder or should slack develop from other causes in the cable 23, a tendency might develop to lower the gate. The bracket or brackets 57, if present, will avoid that tendency. The bracket is not in contact with the body floor when the gate is in the dotted line position of Figure 5. But when the gate is manually moved to the full line position of that figure, the bracket or brackets come in contact with the body or its floor, and thus the weight of the gate can be sustained by the brackets.

I claim:

1. A tail gate assembly for automotive vehicles comprising a tail gate, a transversely extended base member, means on said member for securing it to the frame members of a truck, arm supports carried by, secured to and downwardly projecting from said base member, an outer pair of arms pivoted to said arm supports at points laterally outside of the margins of the vehicle frames, an inner pair of arms pivoted to said arm supports at points inside of the margins of said vehicle frames, the pivot points of the inner pair of arms being below and to the rear of the pivot points of the outer pair of arms, the outer pair of arms being pivoted to the gate, and the inner pair of arms being pivoted to the gate, the pivot point of the outer pair of arms on said gate being above and forward of the pivot point of the inner pair of arms on said gate.

2. A tail gate assembly for automotive vehicles comprising a tail gate, a transversely extended base member, means on said member for securing it to the frame members of a truck, said supporting member being shaped to receive said engaging means at a plurality of points, arm supports carried by, secured to and downwardly projecting from said base member, an outer pair of arms pivoted to said arm supports at points laterally outside of the margins of the vehicle frames, an inner pair of arms pivoted to said arm supports at points inside of the margins of said vehicle frames, the pivot points of the inner pair of arms being below and to the rear of the pivot points of the outer pair of arms, the outer pair of arms being pivoted to the gate and the inner pair of arms being pivoted to the gate, the pivot point of the outer pair of arms on said gate being above and forward of the pivot point of the inner pair of arms on said gate.

3. In combination in a vehicle tail gate assembly, a unitary gate support assembly, adapted to be attached to vehicles having frames of different widths, said assembly including a main transverse base member, said base being provided with means to engage vehicle frame members and arranged to receive said engaging means at a plurality of points, a pair of arm supports carried wholly by and secured to said main transverse base member, and two pairs of arms pivoted to said arm supports, the pivot points of said pairs of arms being out of vertical alignment with each other, a gate member, the ends of said pairs of arms being pivoted upon said gate member, and the pivot points of said pairs of arms of said gate member being out of vertical alignment with each other, and power means adapted to be mounted on said vehicle, and a flexible member secured to said arms at one end and to said power means at the other end.

4. In combination in a vehicle tail gate assembly, a gate support assembly adapted to be attached to vehicles having frames of different widths, said assembly including a main transverse base member, said base being provided with means to engage vehicle frame members and arranged to receive said engaging means at a plurality of points, a pair of arm supports carried by and secured to said main transverse base member, and two pairs of arms pivoted to said arm supports, the pivot points of said pairs of arms being out of horizontal alignment with each other, a gate member, the ends of said pairs of arms being pivoted upon said gate member, and the pivot points of said pairs of arms of said gate member being out of alignment with each other, and power means adapted to be mounted on said vehicle, and a cable secured to said arms at one end and to said power means at the other end.

5. In combination in a vehicle tail gate assembly, a unitary gate support assembly adapted to be attached to vehicles having frames of different widths, said assembly including a main transverse base member, said base being provided with means to engage vehicle frame members and arranged to receive said engaging means at a plurality of points, a pair of arm supports carried by and secured to said main transverse base member, and two pairs of arms pivoted to said arm supports, the pivot points of said pairs of arms being out of alignment with each other, a gate member, the ends of said pairs of arms being pivoted upon said gate member, and the pivot points of said pairs of arms of said gate member being out of alignment with each other, and power means adapted to be mounted on said vehicle, and a cable secured to said arms at one end and to said power means at the other end, there being an adjustable connection at the end of said cable which is attached to said arms.

6. In combination in a unitary tail gate supporting and moving means, a transverse base member adapted to be secured to a vehicle, vehicle engaging members carried by said base member, said base member shaped to provide a plurality of points of attachment for said engaging members at different points along its length, said base member carrying arm supports, an inner pair of arms pivoted at one end upon said supports, an outer pair of arms pivoted above and to the rear of said inner arms, a tail gate, the arms of each pair being pivoted thereto, the pivot points of the inner arms upon said tail gate being below and to the rear of the pivot points of said outer arms of said tail gate, and a hydraulic cylinder, a sub-frame therefor, a piston therein, means for supplying pressure fluid thereto, a flexible member connected at one end to said piston and at the other end to said inner arms, and attaching means joining said flexible member to said inner arms.

7. In combination in a unitary tail gate supporting and moving means, a transverse base member adapted to be secured to a vehicle, vehicle engaging member carried by said base member, said base member shaped to provide a plurality of points of attachment for said engaging members at different points along its length, said base member carrying arm supports, an inner pair of arms pivoted at one end upon said supports, an outer pair of arms pivoted above and to the rear of said inner arms, a tail gate, the arms of each pair being pivoted thereto, the pivot points of the inner arms upon said tail gate being below and to the rear of the pivot points of said outer arms of said tail gate, and a hydraulic cylinder, a sub-frame therefor, secured to said transverse base member, a piston therein, means for supplying pressure fluid thereto, a cable connected at one end to said piston and at the other end to said inner arms, and attaching means joining said cable to said inner arms, said attaching means including parts adaptable to be manipulated to accomplish adjustment of the cable with respect to the inner arms.

8. In combination in a tail gate supporting and moving means, a base member adapted to be secured to a vehicle, vehicle engaging members carried by said base member, said base member shaped to provide a plurality of points of attachment for said engaging members at different points along its length, said base member having a pair of downwardly projecting arm supports, an inner pair of arms pivoted at one end upon said supports, an outer pair of arms pivoted above and to the rear of said inner arms, a tail gate, the arms of each pair being pivoted thereto, the pivot points of the inner arms upon said tail gate being below and to the rear of the pivot points of said outer arms of said tail gate, and a hydraulic cylinder, a sub-frame therefor, a piston therein, means for supplying pressure fluid thereto, a cable connected at one end to said piston and at the other end to said inner arms, and attaching means joining said cable to said inner arms, said attaching means including parts adaptable to be manipulated to accomplish adjustment of the cable with respect to the inner arms.

9. In combination in a tail gate supporting and moving means, a base member adapted to be secured to the frame of a vehicle, vehicle frame engaging members carried by said base member, said base member shaped to provide a plurality of points of attachment for said engaging members at different points along its length, said base member having a pair of downwardly projecting arm supports, an inner pair of arms pivoted at one end upon said supports, an outer pair of arms pivoted above and to the rear of said inner arms, a tail gate, the arms of each pair being pivoted thereto, the pivot points of the inner arms upon said tail gate being below and to the rear of the pivot points of said outer arms of said tail gate, and a hydraulic cylinder, a sub-frame therefor, a piston therein, means for supplying pressure fluid thereto, a cable connected at one end to said piston and at the other end to said inner arms, and attaching means joining said cable to said inner arms, said attaching means including parts adaptable to be manipulated to accomplish adjustment of the cable with respect to the inner arms.

10. In combination in a unitary tail gate assembly for mounting upon an automotive vehicle, a tail gate, bracket members therefor, means for joining the tail gate to the said bracket for relative swinging movement, two pairs of arms pivoted one within the other at different points to said bracket, a transverse base member adapted to be secured to the frame of a vehicle, said arms being pivotally supported from said base member, and power means mounted on said vehicle, and a flexible member secured at one end to said power means and at the other to said inner arms.

11. In combination in a tail gate assembly for mounting upon an automotive vehicle, a tail gate, bracket members therefor, means for joining the tail gate to the said bracket for relative swinging movement, two pairs of arms pivoted one within the other at different points to said bracket, a base member adapted to be secured to the frame of a vehicle, said arms being pivotally supported from said base member, attaching means secured to said base member and adapted to engage the frames of a vehicle, and power means mounted on said vehicle, and a flexible member secured at one end to said power means and at the other to said inner arms.

12. In combination in a tail gate assembly for mounting upon an automotive vehicle, a tail gate, bracket members therefor, means for joining the tail gate to the said bracket for relative swinging movement, two pairs of arms pivoted at different points to said bracket, a base member adapted to be secured to the frame of a vehicle, said arms being pivotally supported from said base member, attaching means secured to said base member and adapted to engage the frames of a vehicle, said base member shaped to receive said attaching means at a plurality of points throughout its length, whereby the base member may be secured to vehicles of several different widths, and power means mounted on said vehicle, and a flexible member secured at one end to said power means and at the other to said inner arms.

13. In combination, a support comprising a frame having longitudinal, parallel members, a gate and a gate raising assembly, the gate raising assembly comprising a transverse member removably secured to the said frame members, said transverse member being provided with a plurality of points of attachment whereby it may be readily secured to frames of different widths, a hoisting sub-assembly comprising frame members, a hydraulic piston and cylinder, a pump, a control valve housing, and means for operating said housing, all carried from said frame assembly, said sub-frame assembly being mounted upon the vehicle frame and secured at one end to said transverse member, and two pairs of arms, each of said pairs of arms being pivotally supported from said transverse member, the pivot points of each pair of arms differing from that of the other pair of arms, each of said pairs of arms being pivotally connected to said gate, the pivot points of each pair of arms upon the gate differing from that of the other pair of arms, said gate itself being hinged for swinging movement with relation to said arms, the several pivot points being so related that in all positions the gate is retained horizontal.

14. In combination in a unitary tail gate assembly adapted to be mounted upon an automotive vehicle, a tail gate, a transverse base member, means on said member for securing it to the frame members of a truck, a longitudinal cylinder subframe secured to said transverse member, means on the cylinder subframe for securing it to the frame of a truck, arm supports carried by and secured to said base member, a plurality of pairs of arms pivoted to said arm supports and also pivoted to said tail gate, a hydraulic cylinder in said subframe, a piston in said cylinder, a flexible member connected at one end to said piston and at the other end to said arms.

15. In combination in a unitary tail gate assembly adapted to be mounted upon an automotive vehicle, a tail gate, a transverse base member, means on said member for securing it to the frame members of a truck, a longitudinal cylinder subframe secured to said transverse member, means on the cylinder subframe for securing it to the frame of a truck, arm supports carried by and secured to said base member, a plurality of pairs of arms pivoted to said arm supports and also pivoted to said tail gate, a hydraulic cylinder in said subframe, a piston in said cylinder, a flexible member connected at one end to said piston and at the other end to said arms, the pivot points of the said arms on the arm supports being out of vertical and horizontal alignment with each other.

16. In combination in a unitary tail gate assembly adapted to be mounted upon an automotive vehicle, a tail gate, a transverse base member, means on said member for securing it to the frame members of a truck, a longitudinal cylinder subframe secured to said transverse member, means on the cylinder subframe for securing it to the frame of a truck, arm supports carried by and secured to said base member, a plurality of pairs of arms pivoted to said arm supports and also pivoted to said tail gate, a hydraulic cylinder in said subframe, a piston in said cylinder, a flexible member connected at one end to said piston and at the other end to said arms, the pivot points of the said arms on the arm supports being out of vertical and horizontal alignment with each other, and the pivot points of said arms upon said tail gate being out of horizontal and vertical alignment with each other.

FRANK A. NOVOTNEY.